Jan. 27, 1925.

C. O. BROWN 1,524,334

ADJUSTABLE REVOLVING CHUTE

Filed Sept. 23, 1920

INVENTOR
Clarence O. Brown
By Kay, Totten & Brown,
Attorneys

Patented Jan. 27, 1925.

1,524,334

UNITED STATES PATENT OFFICE.

CLARENCE O. BROWN, OF LANCASTER, OHIO, ASSIGNOR TO THE FAIRFIELD ENGINEERING COMPANY OF MARION, OHIO, OF MARION, OHIO, A CORPORATION OF OHIO.

ADJUSTABLE REVOLVING CHUTE.

Application filed September 23, 1920. Serial No. 412,240.

*To all whom it may concern:*

Be it known that I, CLARENCE O. BROWN, a citizen of the United States, and resident of Lancaster, in the county of Fairfield and State of Ohio, have invented a new and useful Improvement in Adjustable Revolving Chutes; and I do hereby declare the following to be a full, clear, and exact description thereof.

My invention relates to chutes for discharging material from elevators, conveyors, and the like, and has for its object to provide a chute which shall be adapted to revolve for the purpose of discharging material in any desired direction and which shall be adjustable to provide for varying degrees of slant in the chute.

Figure 1:
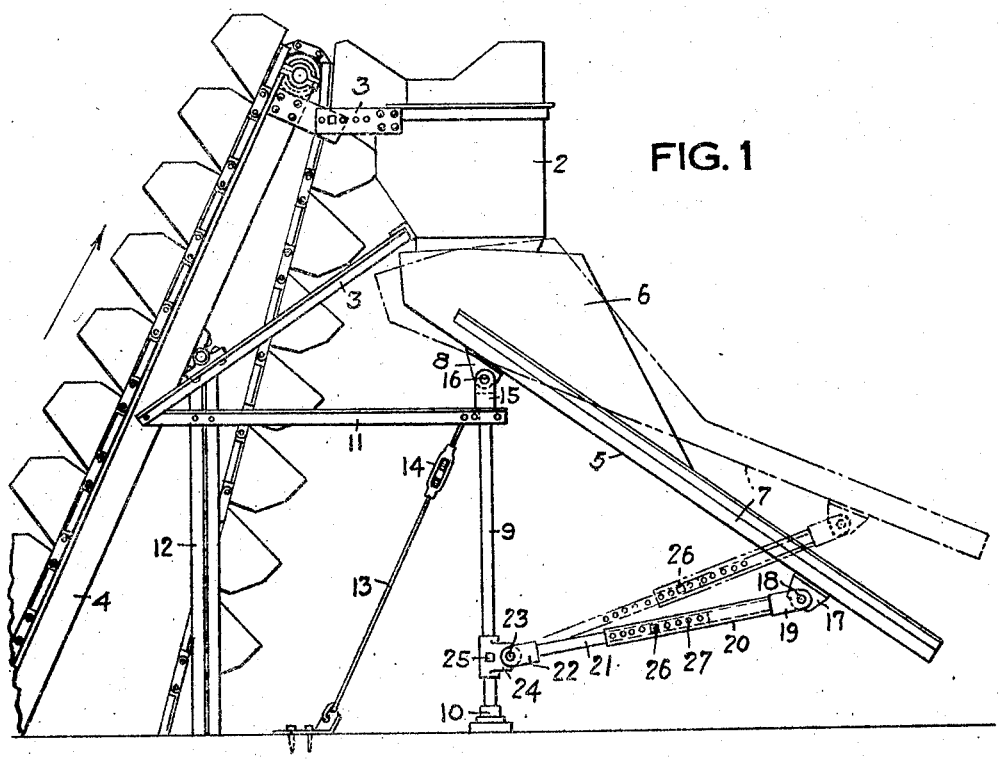
Figure 2:
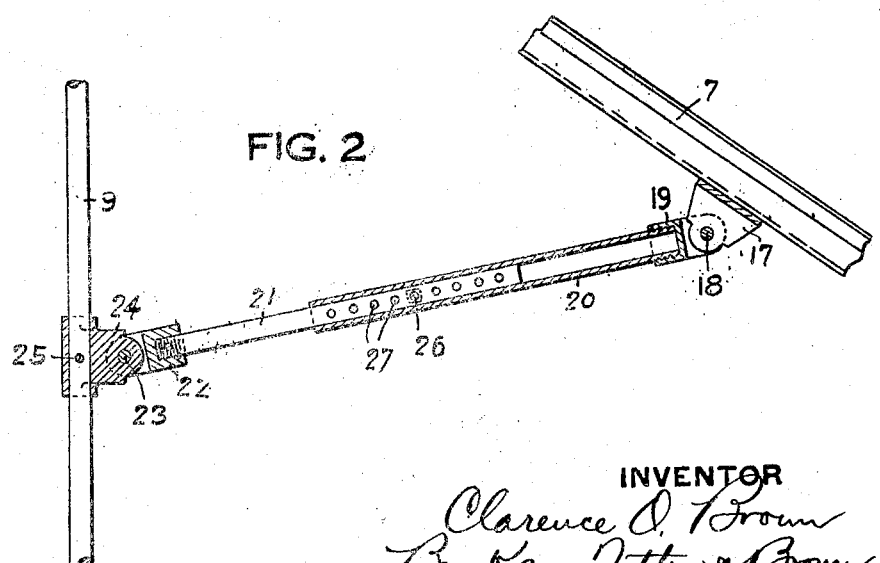

In the accompanying drawing, Fig. 1 is a side elevational view showing my improved chute attached to an endless chain elevator; and Fig. 2 is a vertical sectional view showing the details of the adjusting mechanism.

In handling coal and other kinds of material which are likely to be broken in handling, experience has shown that different grades of material must be handled in different ways. Thus, when coal is unloaded by means of endless chain elevators and discharged through chutes into receiving bins or vehicles, different kinds of coal require varying degrees of slant in the chute. Large lump coal, for instance, will slide on a chute which slants much less than a chute adapted for small coal, slack, run-of-mine, and the like. The result is that a chute arranged to handle the fine coal will allow the coarse coal to go down so fast that it is badly broken up on alighting.

My present invention aims to overcome this difficulty and also to provide for discharging the coal in any desired direction within considerable limits. To this end, the chute is mounted on a revolving support and is provided with an attachment for adjusting the slant of the chute to make it adaptable for handling all grades of material with the same machine.

As shown in the drawing, my improved chute comprises a fixed hopper 2 secured by means of braces 3 to the frame of an inclined endless chain bucket elevator 4, the elevator being here shown for the purpose of illustration only, and not as limiting my invention, which is adapted for use with any kind of conveying or delivering apparatus. Beneath the hopper 2 is the chute 5, which comprises side plates or wings 6 and an inclined trough 7 and is supported by means of a bracket 8 upon a vertical supporting bar 9. The bar 9 rests upon a fixed bearing 10 and is supported near its upper end in a suitable bearing formed by two converging braces 11 which are bolted to uprights 12 and are provided with stays 13 having turn-buckles 14.

The bracket 8 is attached to the upper end of the supporting bar 9 by means of a swivel member or cap 15 which fits over the top of the bar 9 and permits the chute to swing horizontally. The swivel member 15 is attached to the bracket 8 by means of a pivot pin 16 which permits the chute to be also swung vertically.

The trough portion 7 of the chute is provided near its lower end with a bracket 17 which is attached by means of a pivot pin 18 to a coupling member 19 which is internally screw-threaded to receive a pipe 20. A member 21, which may be a solid bar or a pipe of smaller diameter than the pipe 20, has one end received in the pipe 20 in telescopic relation, and is screw-threaded at its other end for attachment to a coupling member 22 which is secured by means of a pivot pin 23 to a sleeve 24 which surrounds the supporting bar 9 and is fixed in position thereon by means of a set screw 25.

The pipe 20 and the member 21 are secured together in various positions of adjustment by means of a pin, bolt or set screw 26 which is adapted to extend through any one of a number of holes 27 formed along the pipe 20 and along the member 21. If a set screw is employed for this purpose, the openings in the member 21 may be omitted if desired, or they may be retained to assist the set screw in preventing relative lengthwise movement of the pipe 20 and the member 21.

The arrangement just described provides for a large number of adjustments, one of which is illustrated in Fig. 1 where the chute is shown in full lines in one position and in dotted lines in a position less slanting than the full-line position. The change from the full-line position is made by releasing the set screw or pin 26, lifting the chute to the desired angle and again tightening the set screw or, if a pin or bolt is used, inserting it in the proper hole 27. The pivotal connections 18 and 23 permit, the brace formed by the members 20 and 21 to adjust itself to the angle of the chute.

While I have herein shown and described an embodiment of my invention which is simple and convenient and which I now prefer to employ, it will be understood that various changes in the details of construction may be made without departing from my invention. I therefore desire that no limitations be imposed upon my invention except such as are indicated in the appended claim.

I claim as my invention:

The combination of a fixed support carrying an upper bearing, a lower bearing, a shaft supported in said bearings, a horizontal pivot member carried by the upper end of said shaft, a chute mounted on said pivot member, means for varying the inclination of the chute comprising a sleeve adjustable longitudinally of said shaft, a strut member having one end pivotally connected to said chute, a strut member having one end pivotally connected to said sleeve, and means for connecting the other ends of said strut members in telescopic relation.

In testimony whereof I, the said CLARENCE O. BROWN, have hereunto set my hand.

CLARENCE O. BROWN.

Witnesses:
JOHN FOX,
J. D. VAN GUNDY.